(12) United States Patent
Qiao et al.

(10) Patent No.: US 7,286,531 B2
(45) Date of Patent: Oct. 23, 2007

(54) METHODS TO PROCESS AND FORWARD CONTROL PACKETS IN OBS/LOBS AND OTHER BURST SWITCHED NETWORKS

(76) Inventors: Chunming Qiao, 85 Misty La., E. Amherst, NY (US) 14051; John Staley, 5802 Flintshire La., Dallas, TX (US) 75252

( * ) Notice: Subject to any disclaimer, the term of this patent is extended or adjusted under 35 U.S.C. 154(b) by 1020 days.

(21) Appl. No.: 10/104,843

(22) Filed: Mar. 22, 2002

(65) Prior Publication Data

US 2002/0141398 A1    Oct. 3, 2002

Related U.S. Application Data

(60) Provisional application No. 60/279,315, filed on Mar. 28, 2001.

(51) Int. Cl.
*H04L 12/56* (2006.01)
(52) U.S. Cl. .................. 370/390; 370/392; 370/400
(58) Field of Classification Search ............. 370/438, 370/439, 380, 381, 384, 400, 395.2, 360, 370/390, 392; 398/102, 45, 54
See application file for complete search history.

(56) References Cited

U.S. PATENT DOCUMENTS 5,448,559 A * 9/1995 Hayter et al. ............. 370/398
6,141,346 A * 10/2000 Caldara et al. ............ 370/390
6,192,049 B1 * 2/2001 Sohraby .................... 370/389
6,570,876 B1 * 5/2003 Aimoto ..................... 370/389
6,721,315 B1 * 4/2004 Xiong et al. .............. 370/389
6,804,255 B1 * 10/2004 Zheng et al. .............. 370/468
6,898,205 B1 * 5/2005 Chaskar et al. ........... 370/450
6,956,868 B2 * 10/2005 Qiao ......................... 370/466
2002/0118421 A1 * 8/2002 Xiong et al. .............. 359/140
2002/0141350 A1 * 10/2002 Qiao et al. ................ 370/252

* cited by examiner

*Primary Examiner*—Min Jung

(57) ABSTRACT

The invention provides a novel method to reduce the minimum offset time and pre-transmission delay for data in Optical Burst Switching or Labeled Optical Burst Switching or other packet or burst switched systems, as well as in circuit-switched networks. Under this method, a control packet is relayed as soon as it is determined if bandwidth for the data at the output port(s) can be reserved successfully, greatly speeding up the setup and configuration of the Switching Elements. A control packet is processed by a pipeline with up to 6 stages, and in addition, a control packet is processed using multiple processors at each port to speed up the time taken to determine if bandwidth for the corresponding data at the desired output port(s) can be reserved successful.

10 Claims, 5 Drawing Sheets

A three hop burst communication example.

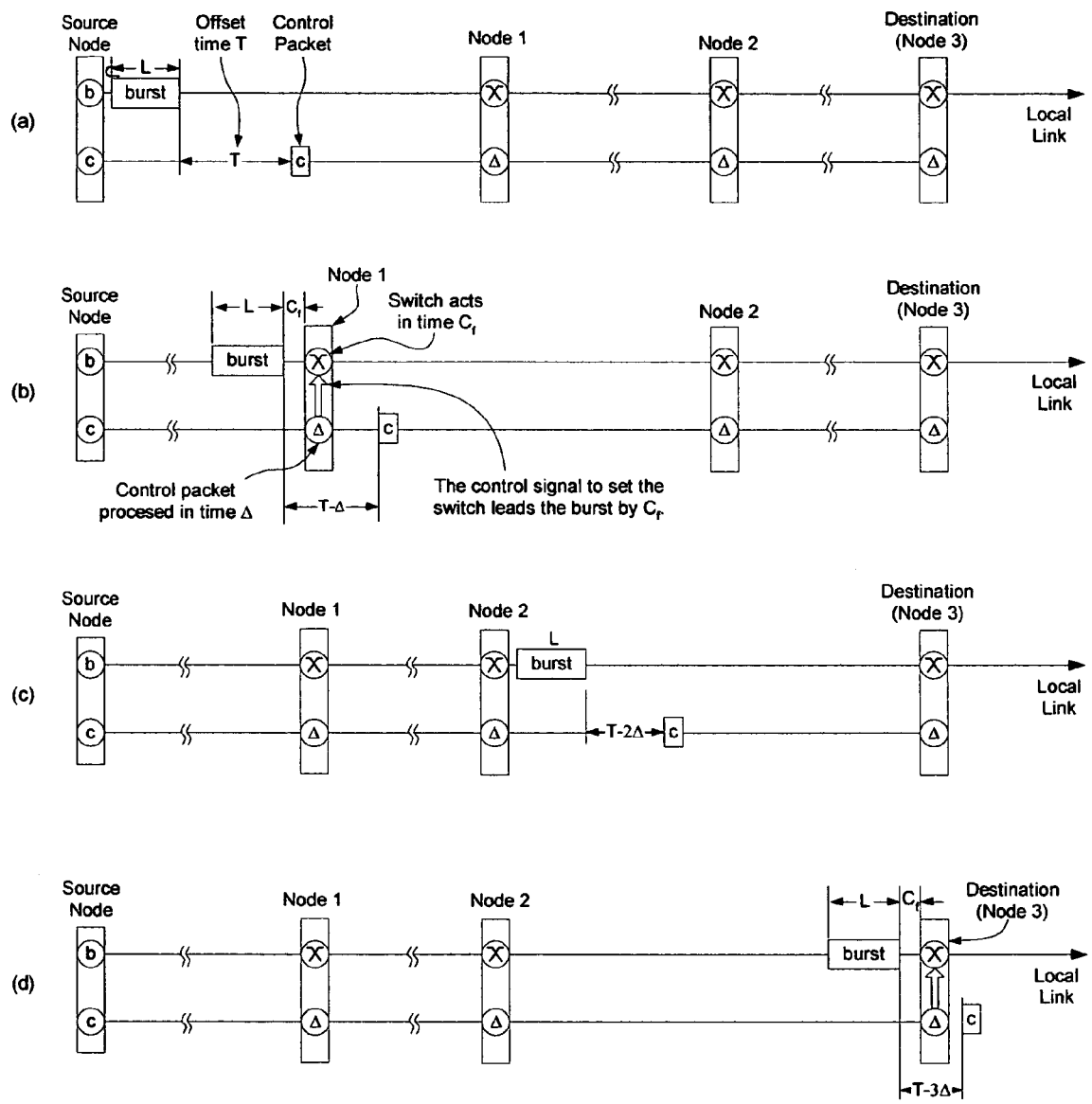
Figure 1 (a),(b),(c),(d). A three hop burst communication example.

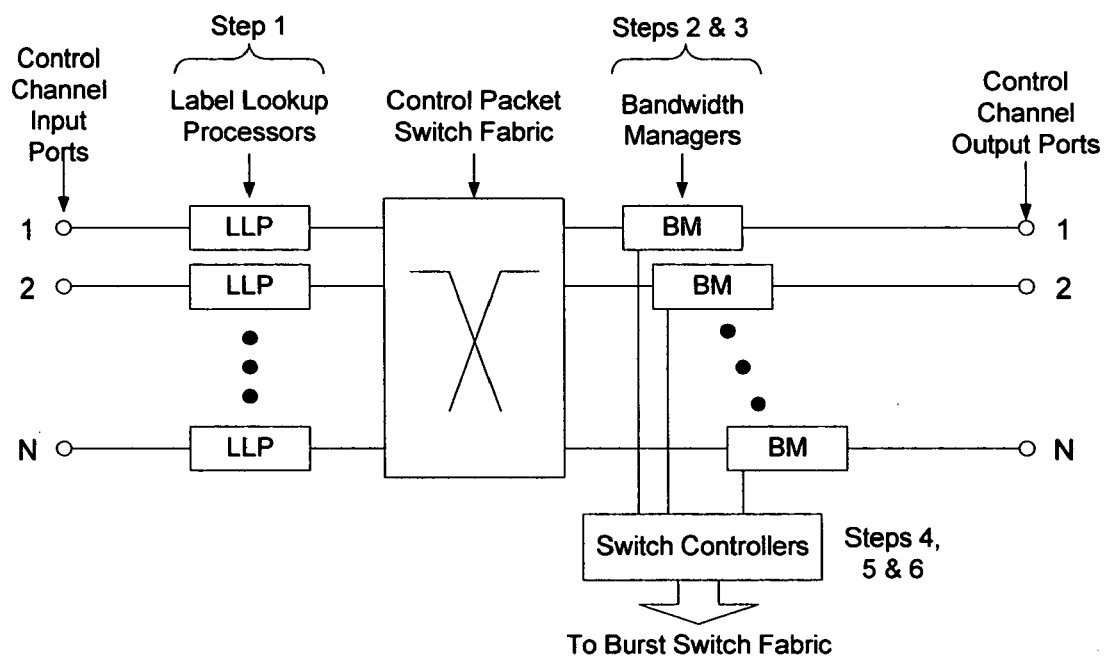
Figure 2  Control packet processing steps.

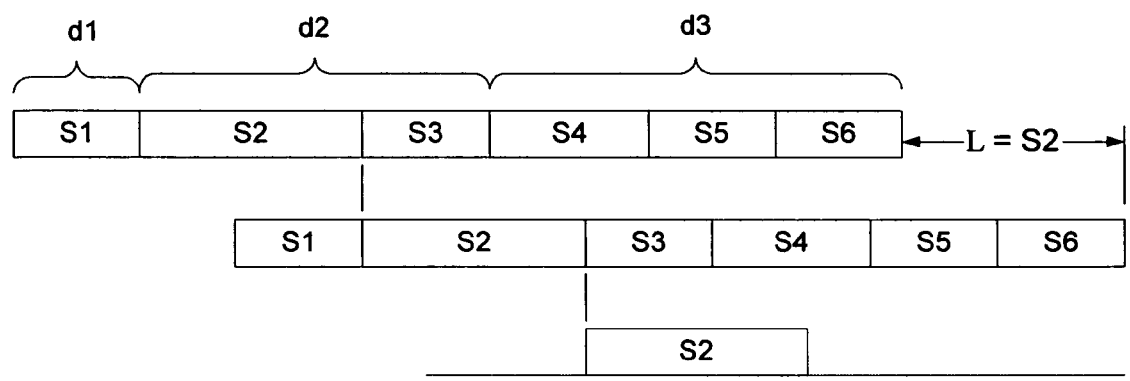
Figure 3.  Pipeline with six (6) stages when s2 is assumed to be large.

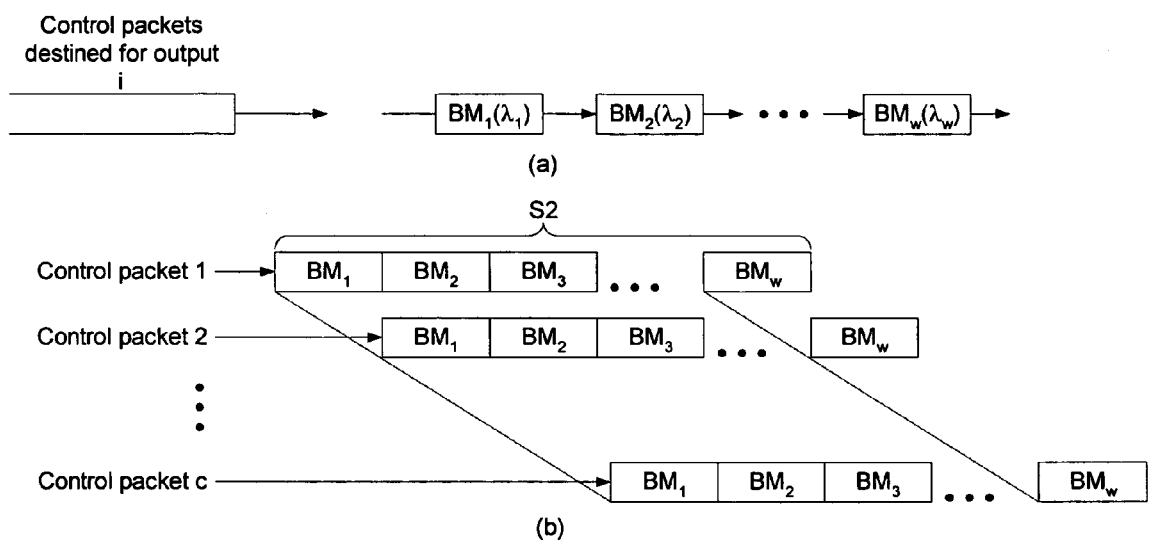
Figure 4     Pipelining stage 2 (s2) in Figure 3.

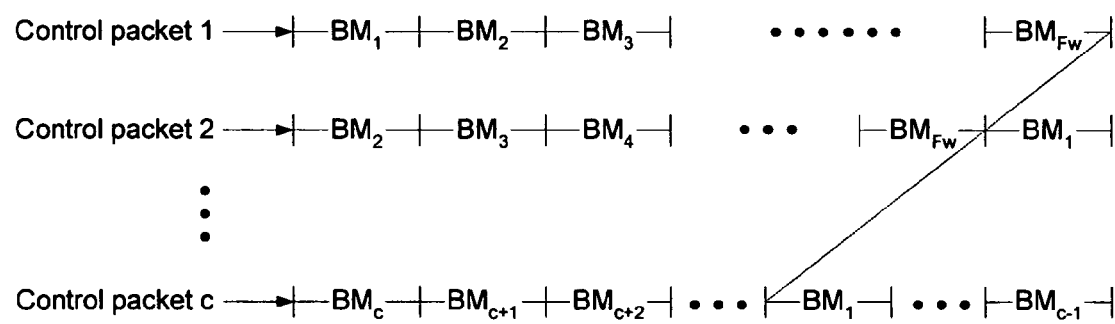
Figure 5.    Batch processing of control packets.

METHODS TO PROCESS AND FORWARD CONTROL PACKETS IN OBS/LOBS AND OTHER BURST SWITCHED NETWORKS

RELATED APPLICATIONS

This application claims priority to Provisional Patent Application, S.N. 60/279,315, filed Mar. 28,2001.

BACKGROUND OF THE INVENTION

Field of the Invention

This invention relates to the application of unique methods for processing and forwarding control packets to improve the operating performance of Optical Burst Switched, Labeled Optical Burst Switched, and other burst switched or packet switched networks, as well as circuit-switched networks.

Internet network traffic exhibits large transient spikes in traffic loads independent of the number of individual data flows that have been aggregated together into a larger single flow. Such behavior is said to be "bursty" and fractal, as the pattern of demand remains self-similar at all scales of aggregation. Packet switching networks are capable of carrying bursty traffic efficiently since they can switch network bandwidth dynamically on a packet-by-packet basis, and therefore are able to provision the needed bandwidth to handle a burst of traffic, typically within a few nanoseconds or less. Circuit switched networks, on the other hand, are not bandwidth efficient in carrying bursty traffic since they can only make relatively long lived (typically on the scale of a millisecond or longer) bandwidth allocations and so cannot switch bandwidth quickly in response to a traffic burst. Burst switched networks (wherein a burst is the concatenation of one or more packets of variable length), like packet switched networks, can be bandwidth efficient in carrying bursty traffic as they too are capable of switching bandwidth within a small timescale. In order to realize this bandwidth efficiency for bursty traffic, conventional packet switching and burst switching networks require fast processing and forwarding of control information, and fast switches to switch traffic at network nodes.

More specifically, in a burst (or variable-length packet) switched network, an incident control packet (or packet header) needs to be processed in order to: determine the output port (or ports in the case of multi-casting) for said control packet; determine the arrival time, the input port, and the input channel within said input port, for the data burst that corresponds to said control packet; determine the output port(s) and channel(s) within said output port(s) for said data burst; determine if bandwidth is available beginning at said data burst arrival time and continuing for the length of time needed for the data burst to enter from the input channel within said input port, travel across the switching elements, and exit from said output channel(s) on said output port(s); if said bandwidth is available, then determine the switching element control signals needed to configure the switching elements (SEs) to connect said input channel within said input port to said output channel(s) within said output port(s); determine and schedule the time at which the switching element control signal will be transmitted to the switching elements; forward said control packet to the determined control packet output port(s); transmit the scheduled switching element control signals at the scheduled time to the switching elements; reconfigure the switching elements in accordance with the switching element control signals received by the switching elements; and forward subsequently incident said data burst arriving on said input channel within said input port to said output channel(s) within said output port(s). The time required to process a control packet arriving on an input port and subsequently forward it to its determined output port(s) has a significant impact on the overall performance of the burst or packet switched network.

As a special case in which the length of data burst in a control packet (which may also be referred to as a "set-up" control packet) is specified to be very long or "infinite" and another control packet (which may also be referred to as a "release" control packet, the method for fast processing and forwarding the control packets is also useful for speeding up the establishment or tear-down of a connection in circuit-switched networks.

To aid in our discussion, we will make the following definitions:

Switching Element Control Signal Propagation Time (p): The elapsed time from when a control signal to change an SE's state is sent to an SE until the time the control signal is received by the SE.

Switching Element Switching time (s): The elapsed time from when a control signal to change an SE's state is received by the SE, until the time at which the SE has reached the new state (new connection) which is stable/usable. Any timing jitters or duration uncertainties which might exist in the switching process is included within this Switching time s.

BRIEF DESCRIPTION OF PRIOR ART

FIGS. 1 (*a*), through (*d*), illustrate a typical Burst Switched network communication path which has been arbitrarily chosen to have three hop bursts, (i.e., number of Hops (H)=3). For simplicity, it is also assumed that the maximum processing time of a control packet at each node, which includes the time to generate a switching element control signal for the switching elements at the node, and schedule its transmission, is $\Delta$. Using conventional control methods, fast switches with switching cycle times of $C=C_r$ are needed in order to achieve a high switching efficiency. In FIG. 1(*a*), a control packet is sent on a control channel (e.g., a wavelength) followed by a data burst of length L on a separate data channel after an offset time in FIG. 1(*b*), the control packet after reaching Node 1, is processed in time $\Delta$ and retransmitted to Node 2 so that in transit to Node 2, the offset between the control packet and the data burst is reduced to T–$\Delta$. The Node 2 processor (which includes a switch controller) learns from the control packet when the burst will arrive and delays sending a switching control signal until there is only just enough time (equal to C) left for the switch to receive the control signal and configure itself before the leading edge of the data burst reaches the switch. Such a delay in sending the control signal is to allow this delay period bandwidth to be used by one or more preceding data bursts which have either already arrived, or are expected to arrive and finish passing through the switch before the switch must transit to a new state to serve the incoming data burst. In FIG. 1(*c*), the time delay between the control packet and the burst is reduced to T–2$\Delta$. In FIG. 1(*d*), the time delay between the control packet and the burst is T–3$\Delta$ which must still be greater than C. At the destination node, the burst is directed to a local link. In general, for a pathway traversing H hops, the initial time delay between the control packet and the burst, called offset-time, T, must be no less than $C_r+H\Delta$.

In prior art, control packets are processed either sequentially or concurrently but with a low degree of parallelism, consequently, the processing time (Δ) can be large, limiting the node's (and network's) throughput. Additionally, in prior art, a control packet is sent to a downstream node only after the current node finishes bandwidth reservation (and the generation, and then scheduling of the transmission of the control signal for the switch) at the current node. This may result in a long pre-transmission (and end-to-end) delay of the corresponding burst, called offset-time, and a low throughput.

It is, therefore, an object of the invention to speed up the processing of control packets in all control packet based Burst Switching architectures such as Optical Burst Switching (OBS) or Labeled Optical Burst Switching (LOBS) or other burst or packet switched networks in order to increase the throughput. It is a further object of the invention to forward the control packet to the downstream node at up to the earliest possible time to reduce the minimum offset time (and pre-transmission delay of each burst) for OBS or LOBS or other burst or packet switched networks. It is also an object of this invention to extend this invention to all signal channel ("channel") data transport schemes, containing one or more channels within an output port, and of which WDM is an example.

SUMMARY OF INVENTION

The above and related objects are achieved by providing unique methods for processing control packets that improve the operating performance of Optical Burst Switched, Labeled Optical Burst Switched, and other burst or packet switched networks. These methods include: a finer partitioning of control packet processing operations and then reordering these operations to reduce control packet processing time for burst switched networks; increasing control packet processing throughput via a six stage processing pipeline, increasing processing parallelism by adding additional processors to each output port (up to one processor per channel within each output port), and increasing throughput by batch processing control packets at an output port via coordinated parallel multi-stage pipeline processing across multiple processors.

In transmissions over an OBS or LOBS or other packet or burst switching network, a control packet is transmitted first, followed by a data burst, corresponding to said control packet, which is sent after an (initial) offset time T. (The value of T will be discussed below). Said control packet is time-stamped when it arrives at an intermediate node, but may or may not be processed by the node immediately. Said control packet, in addition to the offset time, also includes other information such as addressing information (e.g., a label) and possibly the channel (e.g. the wavelength) to be used by said data burst to reach the next hop. As described earlier, the offset time is reduced by the control packet processing time Δ after said control packet is processed at each hop. From processing said control packet, an intermediate node determines the appropriate output channel(s) within the appropriate output port(s) for said control packet and said data burst, determines if bandwidth is available at said output channels within said output port(s) when said data burst arrives, and if so, generates the appropriate switching element control signals used to set/configure the switching elements so said corresponding data burst will be switched to said output channel(s) within said output port(s).

The appropriate output channel to be used by said data burst (subject to bandwidth availability to be described later) is dependent on the input channel used by said data burst and whether said intermediate node can convert said input channel to a different channel(s) within said output port at said intermediate node. Without channel conversion capability (e.g. wavelength conversion capability), the output channel(s) have to be the same as the input channel; otherwise, the output channel(s) can be any channel(s) that the input channel can be converted to. It is noted that said control packet and said data burst are not restricted from using use the same input channel and input port and the same output channel(s) and within an output port(s).

Specifically, the following operations are performed on said control packet at an intermediate node, which for simplicity, is assumed in this detailed description of the invention to be bufferless, but have full channel conversion capabilities:

1) Given the input channel within an input port at which a control packet has arrived and the control information (e.g., a label) carried by said control packet, determine the output port(s) for said control packet and the data burst corresponding to the control packets, as well as any new control information (e.g. a new offset time for said control packet) to be carried by the control packet (by looking up a label switching table at the node);

2) Determine if bandwidth during a certain period (as to be specified later) at said output port(s) can be reserved successfully and (a) if successful, blocks and other control packets from reserving this bandwidth during that period, and forwarding the control packet to said determined output port(s); (b) if unsuccessful, performing one or more operations to resolve contention on said control packet and said data burst (such as burst dropping and or deflection routing, (and said corresponding data burst).

3) Reserve said bandwidth (by completing book-keeping tasks required to maintain the data structure used to represent the bandwidth availability/usage information), and 4) Determine how to set/configure the SEs (and the switch in general), including channel converters—specifically, what the control signals should be generated and to properly configure the switching elements and channel converters so that the corresponding data burst will be switched to the output(s) channel(s).

5) Generate those switching element and channel converter control signals and

6) Schedule the transmission of those switching element and channel converter control signals either immediately or at a later time).

If the switch has limited delay buffers (e.g. FDLs consisting of an array of FDLs arranged in parallel, feed-forward or feed-backward/re-circulating fashion), whether an incoming burst can use a delay buffer or not when there is NO bandwidth available on the output channel during the desired period is also determined during step 2(b), with the actual reservation of the delay buffer capacity done in step 3, and the generation and scheduling of the control signals to be sent to the delay buffer array controller done thereafter in steps 4 through 6. It is noted that the use of delay buffers allows for the use of zero offset time (i.e. the offset time T is held as zero by adding a delay at each node equal to the reduction in offset time resulting from the control packet processing time at each node).

Let Δ be the (maximum) time to complete the above six steps. Using existing approaches known in the art for OBS/LOBS, the control packet is relayed to the next hop after Δ units (i.e. after finishing the control operations described above). Hence, if the path for the control packet/burst to take has H hops, and the maximum time to finish the above steps at each intermediate node is $\Delta$, the minimum offset time T needed is $H \times \Delta + s$, where s is the switching time.

Note that, in prior art, the operations have not been defined in the six steps as above. In prior art for OBS networks [JSAC 2000], a three-stage pipeline has been proposed, whereby similar operations to those defined in step 1 above is processed in Stage 1, and similar operations to those defined in steps 2 and 3 are processed in Stage 2, and similar operations to those defined in steps 4,5 and 6 are processed in Stage 3. In addition, in prior art, there is only one processor per output port to perform operations in steps 2 and 3. It was concluded that the (maximum) throughput (in terms of number of bursts per second) is the minimum of 1/d1, 1/d2 and 1/d3, where d1, d2 and d3 are the time needed to complete Stage 1 (step 1), Stage 2 (steps 2 and 3), and Stage 3 (steps 4 through 6), respectively.

We also note that performing the operations in the above six steps will speed-up packet scheduling in packet-switched networks where a packet contains both control information (called a header) and data (called a payload). In this case, a control packet (header) and its corresponding data burst (payload) use the same output channel(s), and (through the use of delay buffers), use an offset time of T=0.

DESCRIPTION OF DRAWINGS

FIGS. 1 (*a*)-(*d*) depicts a three-hop burst communication example.

FIG. 2 depicts the control packet processing steps.

FIG. 3 depicts a pipeline with 6 stages when S2 is assumed to be large.

FIG. 4 depicts the use of multiple processors to speed up pipelining stage 2 in FIG. 3.

FIG. 5 depicts batch processing of control packets.

DETAILED DESCRIPTION OF INVENTION

The invention provides a novel method to reduce the minimum offset time (and pre-transmission delay) for each burst in OBS or LOBS or other packet or burst switched systems. Under this method, the control packet is relayed as soon as step 2 is completed, greatly speeding up the setup/configuration of the Switching Elements. Also, a deeper pipeline with 6 stages is used to facilitate parallel processing and, multiple processors per output port, up to one processor per channel, are used to speed up step 2.

Let the maximum time taken to finish steps 1 and 2 at each hop to be $\delta$, where $\delta < \Delta$. By using this novel method, the minimum total offset time can be reduced to $(H^*\delta + \Delta \cdot \delta + s)$, or $(H-1)^*\delta + \Delta + s$. The total time saving is thus $(H-1)(\Delta - \delta)$. Note that the method is applicable even in cases in which the processing time differs at different hops.

The main advantage of this method is that it is able to reduce the minimum offset time (or pre-transmission delay of each burst), and hence the end-to-end delay of each burst. It is especially useful for switches made of multi-stage of SEs and/or having FDLs and wavelength converters as steps 3 and 4 may take a significant amount of time.

The step of determining if the bandwidth at the output can be reserved successfully (step 2 above) can be further optimized by the following novel method, which speeds up the processing of control packets and in so doing, increases the throughput. The time each node spends on processing each control packet is important as it affects the throughput/utilization of control channels and consequently that of the data channels as well.

To improve the throughput of control packets in LOBS networks, each input port will be equipped with a label processor which performs step 1 above, and directs the control packet for further processing to a processor (or set of processors)—called bandwidth managers or BM (or BMs)—dedicated to the desired output port (see FIG. 2) which will perform steps 2 and 3. A separate switch control unit will be used to perform steps 4, 5 and 6. The invention not only separates each step into one pipeline stage, but also uses multiple processors as BMs instead of only one processor at each output port for parallel processing in step 2.

In a LOBS network, d1 is expected to be (relatively) small, especially when step 1 (label matching) is implemented in hardware (e.g., some ASICs using associated memory technology). Further, step 1 is not a strictly sequential operation in that more than one matching can be performed simultaneously as long as sufficient amount of matching hardware is present (e.g. multiple input port processors performing label matching or other routing). Meanwhile, d2 and d3 are expected to be large especially in WDM networks, and hence may dominate the throughput (i.e., become the bottleneck). In particular, step 2 is critical as the operation to determine bandwidth availability (as well as allocate bandwidth to bursts) is largely a sequential one (for which control packets have to be processed one by one) in order to maintain a consistent view of the bandwidth availability. On the other hand, the time taken by steps 3 through 6 may not be critical as parallel processing techniques can be readily adopted (especially when the switch is strictly non-blocking).

The proposed scheme improves upon the prior art by further separating the operations involved in steps 2 through 6, and using a deeper (6 stage) pipeline as illustrated in FIG. 3. More specifically, after a control packet clears stage i ($1 <= i <= 6$), the next control packet may be processed at/by that stage immediately. Let the time to finish each stage in the pipeline shown in FIG. 3 be s1, s2, ..., s6, respectively, then the maximum throughput can be as high as the minimum of 1/s(i), for i=1, 2, ..., 6. In fact, based on the previous discussion, the maximum throughput is going be limited only by 1/s2 if parallel processing techniques are used in all other steps.

For WDM networks where nodes have Channel (wavelength) conversion capability, the invention provides the following techniques to further increase throughput by reducing the time taken for the critical step (i.e., step 2).

To facilitate discussion, we assume, for the time being, that: 1) there is only one outgoing fiber with W Channels (wavelengths) per output port, and 2) when searching for bandwidth, the Channels (wavelengths) will be searched in the order of increasing index, i.e., starting at Channel (wavelength) 1, then Channel (wavelength) 2 and so on.

When W is large, the time to hunt for bandwidth (or in other words, step 2 above) using existing methods (including the method with the above disclosed improvement but without the techniques to be described below) may be so long that it becomes the bottleneck in the pipeline. This is mostly likely when a control packet is considered to have cleared stage 2 only if: 1) all W Channels have been searched and no bandwidth is found (in such a case, the control packet may be dropped if the burst cannot be delayed when it arrives, e.g. by FDLs), or, 2) bandwidth is found on one of the Channels. Note that even when 2) is the case, the next control packet may NOT enter stage 2 of the pipeline in some implementations as additional hardware and control complexities are needed to allow dynamic adjustments of the pipeline control. Even though such dynamic adjustments are made from time to time, the average amount of time taken by stage 2 is about ½ of s2.

Under the novel method of the invention, each Channel (wavelength) is associated with a dedicated bandwidth manager (BM), which manages the corresponding Channel (wavelength) only. When a control packet finishes stage 1 processing, it is handed over to BM1, and if no bandwidth is found by BM1 (on Channel 1), the control packet is handed over to BM2, and so on. As soon as BM finishes processing of the control packet, it may process the next control packet (note that it does not matter to the next control whether/when the BM found bandwidth for the current control packet). This is illustrated in FIG. 4.

In essence, this novel method divides stage 2 of the pipeline shown in FIG. 3 into W sub-stages as shown in FIG. 4, one for each Channel, and can thus process the control packets at the rate of one per s2/W units, achieving a W fold speedup (as far as stage 2 is concerned). This is important because as discussed previously, it means that the maximum throughput can be as high as W/s2. This novel method can be easily extended to a different "search" order, e.g., from Channel W to Channel 1, or any (pre-determined) order (and clearly fits the case where the node has no Channel conversion capability). Also, the method can be applied when there is more than one fiber (e.g., F) by simply numbering the Channels from 1 to FW.

The method disclosed above may be extended to processing a batch of C control packets were C<=the total number of Channels (FW), simultaneously as follows. Control packet 1 will be processed sequentially by BM1, BM2, up to BM(FW), until either BM(i) finds bandwidth for it or BM(FM) finishes processing (regardless of whether bandwidth is found by BM(FM) or not). Similarly, control packet 2 will be processed by BM2, BM3, . . . BM(FW) and up to BM1, and control packet C will be processed by BM(c), . . . , BM(FW), BM1, . . . up to BM(C−1). Compared to pipelined processing, where the time to finish processing C control packets is s2+(C−1)s2/FW, the extended batch-processing method only needs s2 time units, as illustrated in FIG. 5.

When the number of bandwidth managers are (or should be) limited to M<FW, the method proposed above can be further modified as follows: Instead of dedicating a BM to each Channel, a BM will be responsible for all Channels but will work on a Channel during a different time slot than other BMs. Specifically, when the first control packet arrives (assuming this is the beginning of a time slot 1), it will be handled by BM1, which exams Channel 1 during time slot 1, Channel 2 during time slot 2 and so on. If another control packet arrives during time slot i, and BMj is idle at the moment, then BMj will handle it by examining Channel c=[(i+j−2) module FW]+1 during that slot, and Channel [(i+j−1) module NJ]+1 and so on.

As long as the number of control packets that arrive close to each other (i.e., the last one arrives before the processing of the first one completes) is no greater than M, the throughput can still be as high as if there are FW BMs, one of each Channel.

Although the present invention and its advantages have been described in the foregoing detailed description and illustrated in the accompanying drawings, it will be understood by those skilled in the art that the invention is not limited to the embodiment(s) disclosed but is capable of numerous rearrangements, substitutions and modification without departing from the spirit and scope of the invention as defined by the appended claims.

What we claim are:

1. A method for the processing of control packets and their corresponding data in switched networks, wherein when a control packet is received by a network node, said control packet is processed in the following ordered steps comprising:
   a) receiving said control packet at an input port of said network node, determining from the control information carried by said control packet the output port(s) for said control packet and the output bandwidth needed on output channel(s) at said output port(s) for the data corresponding to said control packet, and, modifying the control information to be carried by said control packet;
   b) determining if said bandwidth at said output port(s) can be reserved successfully on said output channel(s) within said output port(s), and:
      (1) if said bandwidth can be reserved, blocking other control packets from reserving said bandwidth, and forwarding said control packet to said output port(s), and then proceeding to step c), or;
      (2) then if said bandwidth cannot be reserved then stopping said processing of said control packet and starting one or more operations to resolve contention on said control packet and said data;
   c) after said control packet has been forwarded, reserving said bandwidth on said output channels(s) by completing book-keeping tasks required to maintain the data structure used to represent the bandwidth availability/usage information;
   d) determining what control signals should be generated to configure said node's switching elements, channel converters, delay buffers and other network devices as may be present, so that said data will be switched to said output channel(s) within said output port(s);
   e) generating said control signals, and;
   f) scheduling the transmission of said control signals for immediate or later transmission.

2. The method of claim 1, wherein any said output channel(s) within said output port(s) may be different from or the same as that used to forward said control packet within said output port(s).

3. The method of claim 2, wherein after said determining if said bandwidth at said output port(s) can be reserved successfully is completed, the remaining of said steps b), c), d), e) or f) may be executed in a different order, or, be further divided into subtasks wherein said subtasks may be executed in a different order so long as the task of said forwarding of said control packet, is completed prior to the completion of all of the said Steps b), c), d), e) and f), or said subtasks of Steps b), c), d), e) and f).

4. The method of claim 3, further comprising the steps of:
   processing said control packet via a sequential processing pipeline of three or more stages, wherein: within the first one or more said stages, said Step a) is executed; within the next said stage, said determining if said bandwidth at said output port(s) can be reserved successfully, executed and; within the remaining one or more said stages, the remaining of said Steps b), c), d) e), and f) or said subtasks of said Steps b) c), d), e) and f) are executed.

5. The method of claim 4, wherein each said input port is equipped with a control packet processor within which said one or more said stages execute Step a) and directing said control packet to the said output port(s) for said next stage processing of said determining if said bandwidth at said output port(s) can be reserved successfully; wherein at each said output port(s) two or more bandwidth managers are dedicated to managing the two or more output channel(s) within said output port(s) and; wherein said control packet is handed over to a first said bandwidth manager which determines if said bandwidth is available, and if no said bandwidth is found by said first said bandwidth manager, said control packet is handed over to a next said bandwidth manager, repeating until available said bandwidth on an output channel is found, or all said bandwidth managers have finished processing of said control packet without finding said bandwidth; and wherein as soon as a said bandwidth manager finishes processing of said control packet, it immediately processes the next said control packet.

6. The method of claim 5, further comprising:
a plurality of said bandwidth managers simultaneously batch processing a plurality of said control packets, wherein at any given time each of said bandwidth managers will process one control packet, and upon finishing processing, each of said bandwidth managers that does not find said bandwidth for its said control packet, passes its said control packet to a next said bandwidth manager to process, repeating until available said bandwidth on said output channel is found by a said bandwidth manager for the said control packet, or all said bandwidth managers have finished processing of the said control packet without finding said bandwidth; and when a said bandwidth manager does not receive a control packet from another bandwidth manager, it immediately processes the next said control packet.

7. The method of claim 4, wherein each said input port is equipped with a control packet processor within which said one or more said stages execute Step a) and directing said control packet to the said output port(s) for said next stage processing of said determining if said bandwidth at said output port(s) can be reserved successfully; wherein at each said output port(s) two or more bandwidth managers are dedicated to managing the two or more output channel(s) within said output port(s); further comprising:
using a plurality of said bandwidth managers simultaneously batch processing a plurality of said control packets such that each of said bandwidth managers will be responsible for processing one said control packet and examining all channels sequentially, and wherein each said bandwidth manager will work on a said channel during a different time slot than all other said bandwidth managers.

8. A method for the processing of control packets and their corresponding data in switched networks and network devices, wherein each input port is equipped with a control packet processor which performs at a minimum the step of determining at least one output port for a received control packet and its corresponding data, and directing said control packet for further processing to the said output port(s) where two or more bandwidth managers are dedicated to managing the two or more output channel(s) within said output port(s); wherein said control packet is handed over to a first said bandwidth manager which determines if output bandwidth on an output channel for the data corresponding to said control packet can be reserved successfully, and if no said bandwidth is found by said first said bandwidth manager, said control packet is handed over to a next said bandwidth manager, repeating until available said bandwidth on an output channel is found, or all said bandwidth managers have finished processing of said control packet without finding available said bandwidth; and wherein as soon as a said bandwidth manager finishes processing of said control packet, it immediately processes the next said control packet.

9. The method of claim 8, further comprising:
a plurality of said bandwidth managers simultaneously batch processing a plurality of said control packets, wherein at any given time each of said bandwidth managers will process one control packet, and upon finishing processing, each of said bandwidth managers that does not find said bandwidth for its said control packet, passes its said control packet to a next said bandwidth manager to process, repeating until available said bandwidth on said output channel is found by a said bandwidth manager for the said control packet, or all said bandwidth managers have finished processing of the said control packet without finding said bandwidth; and when a said bandwidth manager does not receive a control packet from another bandwidth manager, it immediately processes the next said control packet.

10. A method for the processing of control packets and their corresponding data in switched networks and network devices, wherein each input port is equipped with a control packet processor which performs at a minimum the step of determining at least one output port for a received control packet and its corresponding data, and directing said control packet for further processing to the said output port(s) where two or more bandwidth managers are dedicated to managing the two or more output channel(s) within said output port(s); further comprising:
using a plurality of said bandwidth managers simultaneously batch processing a plurality of said control packets such that each of said bandwidth managers will be responsible for processing one said control packet and examining all channels sequentially, and wherein each said bandwidth manager will work on a said channel during a different time slot than all other said bandwidth managers.

* * * * *